Patented July 7, 1942

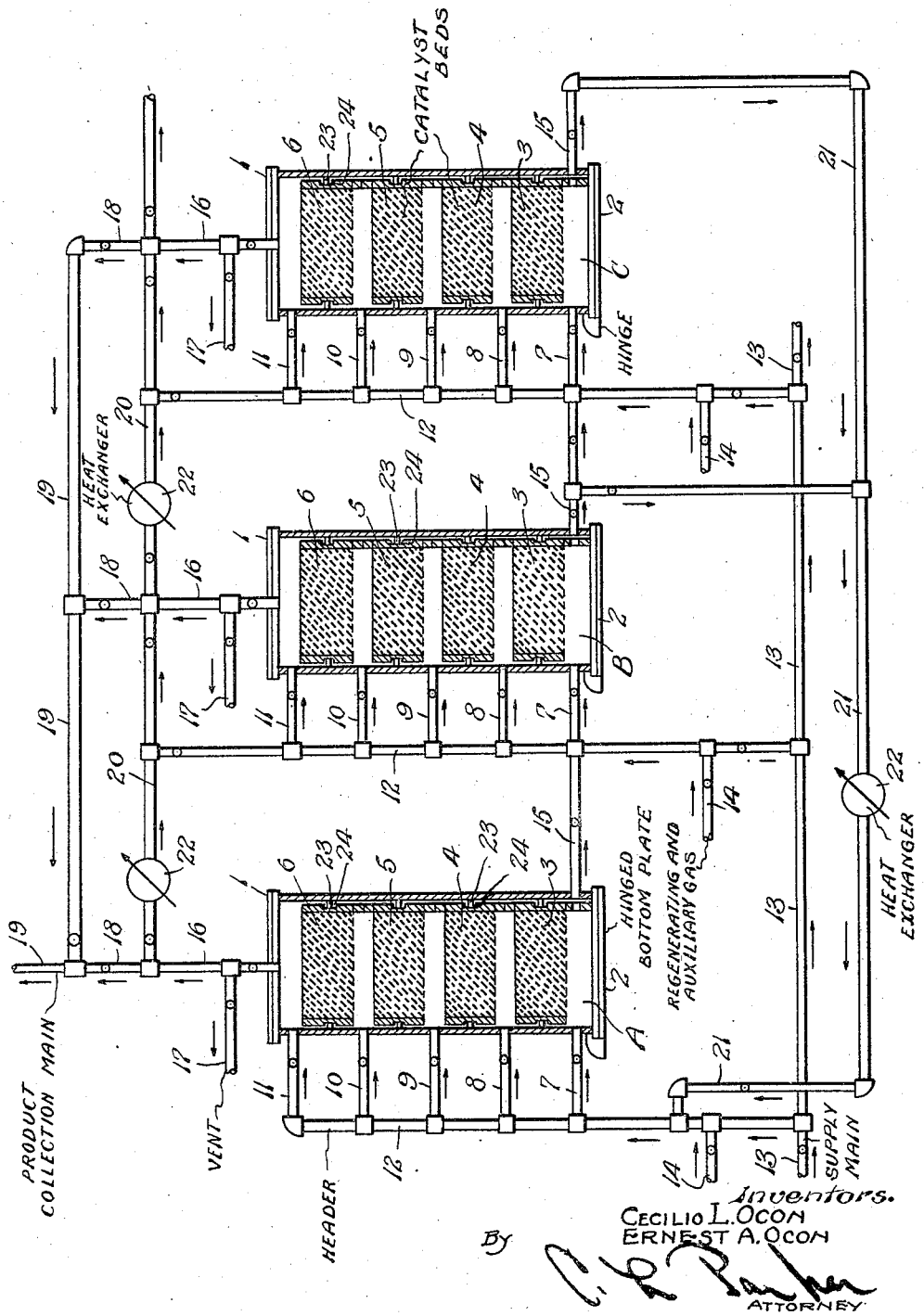

2,289,063

UNITED STATES PATENT OFFICE 2,289,063

METHOD FOR CONDUCTING CONTACT CATALYSIS CONVERSIONS OF FLUID REACTANTS

Cecilio L. Ocon and Ernest A. Ocon, Yonkers, N. Y.; said Cecilio L. Ocon assignor to said Ernest A. Ocon Application December 8, 1938, Serial No. 244,686

1 Claim. (Cl. 196—10)

This invention relates to a method for conducting contact catalysis conversions of fluid reactants. More particularly this invention relates to a method and means for efficiently maintaining adequate active catalyst surface to secure more uniform space velocities in continuous catalytic chemical conversions of vapor phase hydrocarbon reactants, while the catalyst tends to be poisoned by deposition of tarry products or by any other strongly adsorbed inhibiting bodies, such as sulphurous compounds, etc., which might be present among the hydrocarbon reactants and their reaction products.

Even the most widely acclaimed catalytic processes and apparatus of current interest for cracking and for polymerizing hydrocarbons to produce motor fuels have exhibited the following very detrimental characteristics in operations and design. They have lacked the essentials of steady conversion rates in continuous operation by failing to take into account that as a catalyst mass becomes poisoned, the actual space velocity undergoes a variation. Exhaustive use of the catalyst as poisoning proceeded has been ignored in them. They do not contain satisfactory provision for facilitating the removal of a spent catalyst and replacement with a fresh catalyst.

Remedying of the noted detrimental characteristics in the design and operation of continuous catalytic processes and apparatus is an important object of this invention. This is approached by providing an apparatus which permits automatic regulation and more uniformity of actual space velocities, a more exhaustive use of active catalyst before regeneration or renewal of the catalyst, and ready accessibility to the catalyst masses in the reaction chamber for easy and quick removal and replacement of the catalytic masses.

To make this invention easily and fully understood, an explanation will now be made of the drawing which shows diagrammatically a cross-sectional elevation view of the apparatus in a simplified form. For the sake of simplicity a manually valve operated form is shown. In the drawing the same reference characters are used to denote parts having duplicate forms and functions.

A plurality of cylindrical reaction drums, A, B, and C are positioned for convenient operation, proper alignment being more necessary for automatic control. Each reaction drum carries a centrally bored head plate 1 tightly bolted to an upper flange of the drum wall and a hinged bottom plate 2 which on closing the drum is bolted to the bottom flange of the drum wall. During operation the interior of any reaction drum is occupied by a set of superimposed contact mass baskets or containers which easily slide into their illustrated positions or slide out of the drum for removal when a bottom plate is swung ajar. The plurality of baskets, such as the four shown in each reaction drum and numbered 3, 4, 5, and 6, are constructed to rest one upon another. These baskets may be filled with beds of catalytic material, each bed of catalyst preferably being made to rest on a screen but leaving a space below the screen bottom of a superimposed basket. The catalyst may be in the form of chunks, granules, pellets, blocks, etc. A catalyst bed will be represented by the number of its basket container, as shown. Each drum has a series of spaced and aligned inlet openings for pipes 7, 8, 9, 10, and 11, the pipe ends within the drums being flush with the inner walls of the drums so as not to interfere with sliding of the baskets into and out of the drums. Also, these pipe inlets are spaced so that they inject the fluid reactants into the spaces between the catalyst beds.

The inlet pipes 7, 8, 9, 10 and 11 of each drum may be supplied from common header 12 with the intended fluids, each of these inlet pipes being provided with a valve. The common header 12, may be connected by valved connections with a reactant fluid supply main 13, with valved accessory reactant or regenerative gas inlet lines 14, with valved drum bottom outlets 15, and as required, with back flowing reaction mixture line 21 through valved connections.

A pipe 16 is an outlet lead from the head of each drum, and this outlet lead may have valved connections 17 for removal of regeneration fumes, valved connections 18 to the product collection main 19, and forward passing lines 20 to the headers 12 of succeeding drums.

Where each pipe is provided with a valve, a circle (O) is indicated. It is to be observed that the valves may be aligned and connected with an automatic and timed valve adjusting means (not shown), so that the valves may be opened at timed intervals for automatic control of the system.

The reaction drums may be assembled in other appropriate ways, for example, the drums may be arranged in circles, or one superimposed above another, and the catalyst beds may have vertical arrangements which fit into the scheme of this invention. Other piping systems are in order, also, as for instance, supplementary inlets and outlets to and from the drums. Inlets may be made multiple at entry between the catalyst masses. Further, the catalyst baskets may be made of materials which permit expansion to prevent leakage between the sides of the baskets and the inner drum walls, or other means may be used, such as expandible rings 23 fitted like piston rings in grooves 24 of the basket sides. These modifications are mentioned as being in line with this invention.

Now, may be considered the manipulations of the improved catalytic reaction system which contains provisions for steady reaction yields, exhaustive use of the active catalyst, efficient regeneration and efficient replenishment of catalyst.

In the apparatus system shown, hydrocarbon reactants or vapors to be treated may be first passed from the supply main 13 through pipe 7 into drum A, below catalyst bed 3, so that the reaction mixture will pass up through beds 3, 4, 5, and 6 successively. With this series of beds affording sufficient active catalytic surface for the desired amount of conversion under determined appropriate conditions of temperature, pressure, rate of flow, and effectiveness of the catalyst, the reaction products may be withdrawn from the drum by lines 16 and 18 to the product collection main 19 which leads to any well known type of recovery system (not shown). After a period of operation, the catalyst in bed 3 begins to lose strength. Then a substantially steady yield of conversion products is obtained, without substantially disturbing the appropriate conditions, by diverting the reaction mixture withdrawn from the top of drum A through pipe 20 to second header 12 and pipe 10 to be passed mainly through catalyst bed 6 in drum B, whence products of the completed reaction are passed by lines 16 and 18 to the product collection main 19. A minor portion of the reaction mixture may be supplied to the lower part of drum B to sweep the main body of the reaction mixture upwardly through bed 6. Similarly, as beds 3 and 4 in A become fouled or weakened in activity, the reaction mixture is made to pass principally through beds 5 and 6 in A, and beds 5 and 6 in B. Lastly, only bed 6 in A may be used in combination with catalyst beds in another reaction drum, e. g., beds 4, 5 and 6 in drum B, unless the catalysts are regenerated or replaced by fresh catalysts. With the activity of the catalyst practically exhausted in drum A, the desired conversion may be continued at a steady rate by passing the reaction mixture only through the full series of beds in drum B, the charge entering drum B either through line 11 or line 7 from header 12 and its communication with the supply main 13.

It is to be noted that all of the catalyst beds in drum B have substantially complete activity just after they have been used in the described manner in combination with drum A, because in this combined use, none of the beds in B were first in contact with the reaction mixture, hence drum B may be employed while the catalyst in drum A is being revivified in situ or supplied with fresh catalyst. Then, as successive beds of catalyst are rendered inactive in drum B, reaction mixtures may be diverted through line 21 to drum A, for contact with the necessary amount of renewed catalyst therein or be diverted by line 15 to a header 12 of a following drum C. If it is desired to use the third drum C, the reaction mixture may be made to pass successively through beds 5, 4, and 3 in B then through 6 in C, after 6 in B is exhausted; then with both 6 and 5 in B exhausted, the reaction mixture may be made to contact 4 and 3 in B; then 5 and 6 in C; finally with 4, 5, and 6 in B exhausted, bed 3 of B is used in combination with 4, 5, and 6 in C. Similar combination of renewed catalyst beds in drum A may also be employed with beds in drum B, so that a third drum may be eliminated. Facility thus afforded by this invention in the thorough use, regeneration, and replacement of catalyst in each vessel permits economies in the apparatus not hitherto obtained in continuous operations with catalyst vessels used alternately on stream for reaction then off-stream for regeneration.

For proper temperature control each of the reaction drums may be surrounded by any desired types of heating and cooling means (not shown). For example, an electrical resistance coil or a heat exchange jacket may surround the exterior of the drum cylinders with means for controlling the amounts of heat developed at each section. This sectional heating control is helpful for maintaining individual beds at the reaction temperatures while other beds in the same drum are not being fully used for reaction or regeneration. For example, when bed 6 of B is being used to complete reaction in combination with beds 4, 5, 6, in A; bed 6 in B can be individually maintained at the proper temperature for reaction, while lower beds in B, through which only some gases may be passed upwardly for sweeping the main reaction mixture up through bed 6, are allowed to remain at somewhat lower temperatures and thereby reduce excessive reaction of gases which would otherwise tend to diffuse into the lower sections. Also, other manipulations may be used for localizing the reactions in selected beds of any drum, for example, each catalyst container may be provided with covers having one way flow devices, such as check valves.

Provisions, such as heat exchangers 22, may also be made for maintaining the reaction temperatures of the reaction mixtures on passage between the drums.

By varying the factors of temperature, time, and pressure and some small modifications in the catalyst, the system may be used to treat and convert various types of hydrocarbons according to their need for producing valuable motor fuel products. For mainly refining gasoline or Diesel fuel temperatures of the order of 350 to 700° F., and pressures of about 5 to 50 atmospheres, more or less, may be used; in splitting, cracking, or destructively hydrogenating hydrocarbons higher boiling than gasoline, such as gas oil, topped crude, and the like, temperatures in the range of about 800 to 950° F., with superatmospheric pressures up to about 10 atmospheres are preferred; while, in reforming naphthas or topped fractions of a crude oil still higher temperatures and pressures are more suitable. Pressures up to 100 atmospheres or higher may be used satisfactorily with gaseous reactants to increase the capacity of the system and favor polymerization.

Two or more of the treatments or conversion may be carried out together under conditions advantageous for the different reactions, as for example, cracking and reforming even in the presence of some polymerizing may be effected.

The space velocities, measured in cubic feet of vapors, as under standard conditions, flowing through the catalyst zone per hour per cubic foot of catalyst, vary somewhat for each type of conversion. More time, which is roughly inversely proportional to the space velocity, is required for the polymerization than for the cracking reaction. In cracking a catalytic time of contact with an active catalyst is in the range of about 0.5 to about 10 or 15 minutes, less time being required at higher temperatures of the order of 800–900° F., or more. Necessarily the type of catalyst is also a factor on which time of treatment is dependent.

A very effective catalyst for cracking and which is also useful in reforming, polymerizing, and refining on account of its high porosity and resistance to sintering when subjected to oxidizing gases, such as air and steam for regeneration is obtained by mixing ground feldspar, preferably also weathered, or acid treated, with a weathered clay or natural occuring silicious materials, or earths such as kieselguhr, kaolinite, bauxite, and similar materials. The mixture thus formed is, preferably shaped into small pieces, acid treated, washed, and dried prior to use. This type of material is also useful for supporting other catalysts or promoters. As promoters, precipitated alumina, thoria and tungsten trioxide are particularly useful for aiding cracking and reforming. For promoting polymerization of gaseous hydrocarbons it is desirable to use larger proportions of the promoters, e. g., up to about 10%, or mixtures of promoters. In this connection, deliquescent phosphate or sulphate salts, such as copper sulphate, copper phosphate, phosphoric acids, etc., or other hygroscopic acidic substances are also usefully employed with the metal oxide promoters. Gaseous promoters may be employed in addition to the solid promoters or in their stead for accelerating polymerization and reforming reactions. Oxidizing gases such as oxygen, chlorine, and acid anhydrides of phosphoric acid or sulphuric acid, are useful in this respect. Metals which form readily reducible oxides such as nickel, cobalt, iron, etc., may be employed with the porous substrata such as the porous materials above mentioned for aiding in hydrogenation treatment when it is desired to add hydrogen to substantially pure unsaturated hydrocarbons.

As a specific example in which the system is to be used for polymerizing reactive gaseous hydrocarbons which include ethylene, propylene, butylene, amylene and similar gaseous hydrocarbons commonly present in the light vapors produced by cracking or splitting of natural hydrocarbon materials, these gases are passed first through a set of catalyst beds in drum A to a temperature in the range of about 500 to 900° F., and a pressure of the order of 5 to 50 atmospheres. Catalyst beds which have been successfully used are composed largely of hydroalumino silicates commonly known as clayey materials. These materials prior to use are beneficially pretreated by processes of weathering, or washing and contain an admixed minor amount of ground or powdered feldspar which has been similarly pretreated. About 1 to 10% by weight of the feldspar increases porosity of the catalyst mass and increases its refractoriness toward sintering on calcination in drying and regeneration treatments.

As a further example of a particularly effective catalyst for the polymerization, a pretreated clayey material is mixed or impregnated with a mixed or complex salt of copper and phosphoric acid, notably copper uranium phosphate. This material is preferably obtained by partially dehydrating the natural occuring mineral known as torbernite.

In addition, an active metal oxide such as active alumina, obtained by precipitation of aluminum hydroxide followed by partial dehydration of the precipitated hydroxide, is admixed nearly homogeneously with the clayey material in a minor quantity of about 0.5 to 10% by weight prior to forming the catalyst into small pieces in the shape of blocks, pellets, etc., the thus formed catalyst is further improved prior to drying by soaking in a dilute solution of cupric sulphate and then calcined to obtain a porous refractory mass impregnated with the salt in substantially anhydrous state.

The gaseous reactants are passed through a series of the described catalysts in several beds at a suitable space velocity to give them a sufficient time of contact with active catalytic surface, the time of contact ranging from about 3 to 30 minutes, more or less, depending upon the temperature, effectiveness of catalytic surface, and concentration of reactive hydrocarbons. After an initial bed in the series of catalyst beds has become deactivated by tarry depositions or other poisoning substances, the stream of reactants are continuously provided with adequate time of contact by substituting or supplementing an additional bed of the catalyst in a second drum B as described.

Accordingly, a high rate of gasoline yield is maintained throughout the process without detrimental effects in the recovery system, and with fewer reactivations to obtain yields of greater than 4 gallons of gasoline motor fuel per thousand cubic feet of refinery gases processed, this motor fuel product having octane numbers up to 90, and often higher. This polymerized product has a high blending value for improving straight run gasolines and gasolines having insufficiently high octane numbers.

The catalyst drums are manifolded and constructed to permit any drum to be removed from service without hindrance to the continuous operation. The yield rate can be determined from the uniformity of pressure since increase of pressure drop indicates that a bed in the series used is becoming deactivated. The drums are conveniently constructed on a support and sufficiently elevated above the ground level to permit removal of the catalysts in their container which slide easily downwardly through the base of the drums and are readily raised from the bottom into the drum in refilling.

In accordance with the present process, shutdowns of the system is made infrequent, since as each bed becomes contaminated, substituted or supplementary beds are added in an interconnected drum thereby increasing the intervals between reactivation or prolonging the service of each drum while maintaining more constant yields with greater economy in labor, time, etc.

It is to be understood that with this improved system for catalytically converting reactant hydrocarbons other known catalysts and conditions may be used as alternatives or conjointly with those mentioned for promoting reactions including splitting, polymerizing, isomerizing, alkylating, hydrogenating, dehydrogenating, and oxidizing reactions.

Instruments for measuring and controlling temperatures, pressures and flow velocities, and pumps or compressors for impelling the flow of fluids through conduits, and other control apparatus not shown or indicated are to be used for the operation described when required and in a manner well known in the art.

It is to be understood that this invention is not to be limited by theoretical considerations or specific illustrative examples used for purposes of illustration but it is desired to claim all the invention in the broadest scope permitted in the prior art in the following claim.

We claim:

A process for catalytically polymerizing gaseous hydrocarbons to produce anti-knock motor fuel, which comprises passing a continuous stream of reactive gaseous hydrocarbons together with a small amount of oxidizing gas at a temperature in the range of 500 to 900° F., a pressure of about 5 to 50 atmospheres, and at a suitable space velocity serially through a set of polymerization catalyst beds composed essentially of a clayey material mixed with ground feldspar in an amount to increase porosity and refractoriness additionally mixed with a minor quantity of active alumina and a minor quantity of hygroscopic phosphate salt to promote catalytic action, said beds of catalyst providing in combination a sufficient catalytic surface for the desired amount of reaction while the catalyst is in active condition, and passing the remaining reactive gaseous hydrocarbons serially through an added bed of the catalyst in active condition at the reaction temperature when an initial bed in the set becomes substantially deactivated.

CECILIO L. OCON.
ERNEST A. OCON.